(12) United States Patent
Choi et al.

(10) Patent No.: US 11,441,006 B2
(45) Date of Patent: Sep. 13, 2022

(54) RUBBER COMPOSITION FOR TIRES INCLUDING CARBON NANOTUBES, AND METHOD FOR PRODUCING SAME

(71) Applicant: Korea Kumho Petrochemical Co., Ltd., Seoul (KR)

(72) Inventors: Nam Sun Choi, Daejeon (KR); Dong Hoon Oh, Daejeon (KR); Sang Hyo Ryu, Seoul (KR); Chung Heon Jeong, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 258 days.

(21) Appl. No.: 16/637,904

(22) PCT Filed: Aug. 16, 2018

(86) PCT No.: PCT/KR2018/009394
§ 371 (c)(1),
(2) Date: Feb. 10, 2020

(87) PCT Pub. No.: WO2019/035659
PCT Pub. Date: Feb. 21, 2019

(65) Prior Publication Data
US 2020/0216633 A1    Jul. 9, 2020

(30) Foreign Application Priority Data
Aug. 16, 2017 (KR) .................. 10-2017-0103835

(51) Int. Cl.
| C08K 3/04 | (2006.01) |
| C08L 9/06 | (2006.01) |
| C08J 3/22 | (2006.01) |
| B60C 1/00 | (2006.01) |
| C01B 32/162 | (2017.01) |

(52) U.S. Cl.
CPC ............... *C08K 3/041* (2017.05); *B60C 1/00* (2013.01); *C01B 32/162* (2017.08); *C08J 3/22* (2013.01); *C08L 9/06* (2013.01); *C01B 2202/06* (2013.01); *C01B 2202/34* (2013.01); *C01B 2202/36* (2013.01); *C01P 2002/82* (2013.01); *C01P 2002/88* (2013.01); *C01P 2004/04* (2013.01); *C01P 2006/10* (2013.01); *C08J 2309/00* (2013.01); *C08J 2309/06* (2013.01); *C08J 2409/00* (2013.01); *C08K 2201/002* (2013.01); *C08K 2201/011* (2013.01); *C08L 2205/025* (2013.01); *C08L 2310/00* (2013.01)

(58) Field of Classification Search
CPC ..... C08K 3/04; C08L 9/06; C08J 3/22; B60C 1/00
USPC ......................................................... 524/495
See application file for complete search history.

(56) References Cited

U.S. PATENT DOCUMENTS

| 2006/0061011 A1 | 3/2006 | Kikuchi et al. |
| 2006/0238095 A1 | 10/2006 | Nam |
| 2010/0207053 A1 | 8/2010 | Ryu et al. |
| 2012/0040186 A1 | 2/2012 | Ryu et al. |
| 2013/0207026 A1 | 8/2013 | Kim et al. |
| 2014/0087184 A1 | 3/2014 | Choi et al. |
| 2015/0018490 A1* | 1/2015 | Takagiwa .............. C08F 120/06 525/327.4 |
| 2018/0044184 A1 | 2/2018 | Ata et al. |

FOREIGN PATENT DOCUMENTS

| CN | 104203815 A | 12/2014 |
| CN | 104903391 A | 9/2015 |
| JP | 2010-540687 A | 12/2010 |
| KR | 10-1007183 B1 | 1/2011 |
| KR | 2012-0031624 A | 4/2012 |
| KR | 10-1327812 B1 | 11/2013 |
| KR | 10-1380619 B1 | 4/2014 |
| KR | 10-1462426 B1 | 11/2014 |
| KR | 2017-0042931 A | 4/2017 |
| WO | 2016-133201 A1 | 8/2016 |

OTHER PUBLICATIONS

Melezhik et al., "Synthesis of Carbon Nanotubes from Acetone", Nanomaterials and Nanotechnology, Aug. 14, 2013, pp. 435-443, vol. 47, No. 4.

* cited by examiner

*Primary Examiner* — Deve V Hall
(74) *Attorney, Agent, or Firm* — Novick, Kim & Lee, PLLC; Jae Youn Kim

(57) ABSTRACT

An embodiment of the present invention provides a rubber composition for tires and a method for producing same, wherein the rubber composition for tires includes: carbon nanotubes including structural defects on at least a portion of the surface and having a thermal decomposition temperature equal to or less than 600° C.; and a rubber matrix.

13 Claims, 2 Drawing Sheets

RUBBER COMPOSITION FOR TIRES INCLUDING CARBON NANOTUBES, AND METHOD FOR PRODUCING SAME

TECHNICAL FIELD

The present invention relates to a rubber composition for a tire, which includes a carbon nanotube, and a method of preparing the same.

BACKGROUND ART

Tires may be generally classified into a silica tire and a carbon black tire according to the type of filler used in a rubber composition for producing a tire.

Since the carbon black tire has a higher-order structure in which carbon black is intrinsically agglomerated or connected to each other, an adhesive area with a rubber matrix is large, and thus the adhesion with the rubber matrix is easily increased. In addition, a method of further improving the adhesion with the rubber matrix through a modification such as introducing a functional group to the surface of carbon black has been suggested.

Meanwhile, to improve the adhesion between a silica filler with a rubber matrix, a method of bonding them using a coupling agent with a specific structure, for example, an alkoxysilane-based coupling agent, has been used.

Recently, technology using carbon nanotubes instead of conventional carbon black or silica as a filler for a rubber composition for a tire has been highlighted. However, since a carbon nanotube does not have a higher-order structure like carbon black, and has no functional groups such as oxygen or nitrogen on its surface, it is difficult to form a strong bond with a rubber matrix in terms of physical, chemical and physicochemical aspects. Therefore, since the fraction and heat generation at the interface between the carbon nanotube and the rubber matrix increase, when the carbon nanotube is applied to tires, there is a problem of degrading a braking characteristic, fuel efficiency and wear characteristics.

DISCLOSURE

Technical Problem

The present invention is for solving problems of the above-described prior art, and directed to providing a rubber composition for a tire with improved adhesion between a rubber matrix and a carbon nanotube.

Technical Solution

One aspect of the present invention provides a rubber composition for a tire, which includes carbon nanotubes having a structural defect on at least a part of their surfaces and a pyrolysis temperature of 600° C. or less; and a rubber matrix.

In one embodiment, the carbon nanotube may be a bundle-type carbon nanotube which consists of multi-walled carbon nanotubes prepared using a catalyst containing a metal component according to the following formula and having a hollow structure with an outer wall thickness of 0.5 to 10 μm.

$$Ma:Mb=x:y \qquad \text{<Formula>}$$

In this formula,

Ma includes two or more types of metals selected from Ni, Co, Mn, Cr, Mo, V, W, Sn and Cu, Mb includes one or more types of metals selected from Mg, Al, Si and Zr, and x and y represent the mole fractions of Ma and Mb, respectively, in which x+y=10, 2.0≤x≤5.5, and 4.5≤y≤8.0.

In one embodiment, the apparent density of the catalyst may be 0.05 to 0.35 g/mL.

In one embodiment, the outer wall thickness of the catalyst may be 1 to 8 μm.

In one embodiment, the hollow ratio of the hollow structure may be 60 vol % or more.

In one embodiment, the bundle-type carbon nanotube may have an average bundle diameter of 0.5 to 20 μm, and an average bundle length of 10 to 200 μm.

In one embodiment, the multi-walled carbon nanotube may have a Raman spectral intensity ratio ($I_G/I_D$) of 0.8 to 1.5.

In one embodiment, the multi-walled carbon nanotube may have an average diameter of 5 to 50 nm.

In one embodiment, the multi-walled carbon nanotube may have an apparent density of 0.005 to 0.120 g/mL.

In one embodiment, the rubber matrix may include one selected from the group consisting of acrylonitrile-butadiene rubber, ethylene-propylene-diene rubber, styrene-butadiene rubber, butadiene rubber, natural rubber, isoprene rubber, butyl rubber and a combination of two or more thereof.

In one embodiment, the content of the carbon nanotube may be 0.1 to 10 parts by weight with respect to 100 parts by weight of the rubber matrix.

Another aspect of the present invention provides a method of preparing a rubber composition for a tire, which includes: (a) preparing carbon nanotubes, which have structural defects on at least a part of their surfaces and a pyrolysis temperature of 600° C. or less, using a catalyst containing a metal component according to the following formula and having a hollow structure with an outer wall thickness of 0.5 to 10 μm; and (b) mixing the carbon nanotubes and a rubber.

$$Ma:Mb=x:y \qquad \text{<Formula>}$$

In this formula, Ma includes two or more types of metals selected from Ni, Co, Mn, Cr, Mo, V, W, Sn and Cu, Mb includes one or more types of metals selected from Mg, Al, Si and Zr, and x and y represent the mole fractions of Ma and Mb, respectively, in which x+y=10, 2.0≤x≤5.5, and 4.5≤y≤8.0.

In one embodiment, the (b) step may include (b1) preparing a master batch by mixing and pressing the carbon nanotubes and a part of the rubber; and (b2) mixing the master batch and the remainder of the rubber.

Advantageous Effects

As a rubber composition for a tire according to an aspect of the present invention includes carbon nanotubes including a certain level of structural defects, the adhesion with a rubber matrix can be significantly improved, and a tire produced therefrom can be significantly improved in fuel efficiency, a braking characteristic and a wear characteristics due to minimized heat hysteresis caused by friction at the interface between the carbon nanotubes and a rubber matrix.

It should be understood that the effect of the present invention is not limited to the above-described effects, and includes all effects that can be deduced from the configuration of the present invention described in the detailed description or claims of the present invention.

MODES OF THE INVENTION

Figure 1:
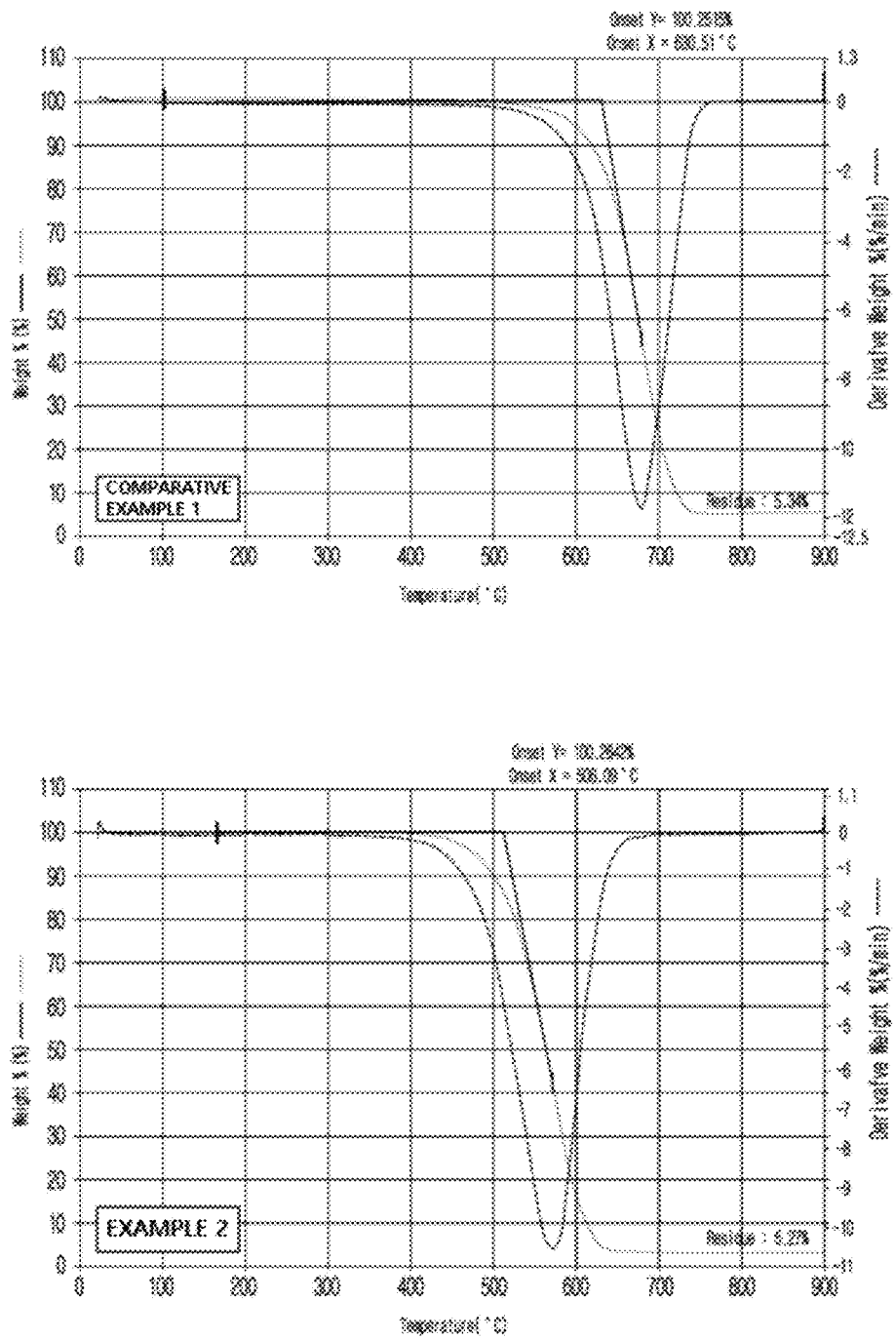
FIG. 1 shows results of thermogravimetric analysis of carbon nanotubes according to an example and a comparative example of the present invention.

Hereinafter, the present invention will be described in detail with reference to the accompanying drawings. However, the present invention may be implemented in a variety of different forms, and is not limited to the embodiments described herein. In addition, in the drawings, for clear explanation of the present invention, parts that are not related to the description are omitted, and like numerals denote like parts throughout the specification.

Throughout the specification, when a part is "connected" with another part, it means that the one part is "directly connected", or "indirectly connected" with a third member therebetween. In addition, when a certain part "includes" a certain component, it means that, unless particularly stated otherwise, another component may be further included, rather than excluding the other component.

Rubber Composition for Tire

One aspect of the present invention provides a rubber composition for including carbon nanotubes which have a structural defect on at least a part of their surfaces and a pyrolysis temperature of 600° C. or less; and a rubber matrix.

Since a conventional carbon nanotube is prepared in powder form, because of a low density (<0.14 g/mL) and to minimize an effect of a mixing process with respect to dust, additional costs for construction of additional equipment are needed, and the carbon nanotubes are randomly agglomerated in the mixing process, resulting in low processability and dispersibility.

To uniformly disperse the conventional carbon nanotubes in a rubber matrix, a physical method, for example, using a master batch method or improving extrusion or a mixing process, or a chemical method such as introducing a functional group that can increase compatibility with a rubber matrix onto the surface of the carbon nanotube or adding a specific chemical component such as a surfactant or dispersant in mixing has been used. However, since such a method may be performed after synthesis of a carbon nanotube or independently performed, it needs an additional process or equipment, which is disadvantageous in terms of economics.

The carbon nanotubes may be synthesized using a catalyst that can impart a certain amount of structural defects to their surfaces, and the structural defects included on the surface of the synthesized carbon nanotubes improve the affinity and adhesion with the rubber matrix, and thus significantly improve the mechanical properties, dynamic properties (braking characteristic and fuel efficiency) and wear characteristics of a tire produced from the rubber composition, and since an additional process or equipment is not needed as in the prior art, it is also advantageous in terms of economic feasibility and productivity.

The structural defects may be identified by a pyrolysis temperature of the carbon nanotube using thermogravimetric analysis (TGA). The pyrolysis temperature of the carbon nanotube may be lowered to 600° C. or less, preferably, 400 to 600° C. and more preferably 500 to 550° C., compared to a conventional temperature of more than 600° C. When the pyrolysis temperature of the carbon nanotube is more than 600° C., since a required amount of the structural defects on the surface of the carbon nanotube may not be imparted, the adhesion with the rubber matrix may be decreased, and thus the mechanical properties, dynamic properties and wear characteristics of a tire produced from the rubber composition may be degraded. In addition, when the pyrolysis temperature of the carbon nanotube is less than 400° C., since the carbon nanotube is structurally very weak, basic reinforcing characteristics may not be imparted.

The content of the carbon nanotubes may be 0.1 to 10 parts by weight, preferably, 0.5 to 5 parts by weight, and more preferably, 0.5 to 3 parts by weight with respect to 100 parts by weight of the rubber matrix, but the present invention is not limited thereto. When the content of the carbon nanotubes is less than 0.1 part by weight, levels of physical properties, dynamic properties and wear characteristics, which are required for a tire, may not be imparted, and when the content of the carbon nanotubes is more than 10 parts by weight, the dispersibility of the carbon nanotubes may be degraded, and it is disadvantageous in terms of economic feasibility.

Such a carbon nanotube may be prepared to have a certain amount of structural defects on its surface using a catalyst containing a metal component according to the following formula and having a hollow structure with an outer wall thickness of 0.5 to 10 μm, and the carbon nanotube may be a bundle-type carbon nanotube consisting of multi-walled carbon nanotubes.

$$Ma:Mb = x:y \qquad \text{<Formula>}$$

In this formula.

Ma includes two or more types of metals selected from Ni, Co, Mn, Cr, Mo, V, W. Sn and Cu, Mb includes one or more types of metals selected from Mg. Al, Si and Zr, and x and y represent the mole fractions of Ma and Mb, respectively, in which $x+y=10$, $2.0 \leq x \leq 5.5$, and $4.5 \leq y \leq 8.0$.

Specifically, the multi-walled carbon nanotube may be prepared by a method including (A) preparing a precursor solution by dissolving a metal precursor in a solvent; (B) forming a catalyst powder including a metal component according to the formula by pyrolyzing the precursor solution after it is sprayed into a reactor; and (C) synthesizing a multi-walled carbon nanotube from the catalyst powder by inputting the catalyst powder into a reactor heated to 600 to 900° C. and spraying a carbon-based gas and a carrier gas, in which the (A) to (C) steps are continuously performed.

In the (A) step, a precursor solution of a metal element, which forms the catalyst powder, may be prepared. The metal precursor may be one selected from the group consisting of a nitrate, a sulfate, an alkoxide, a chloride, an acetate and a carbonate of a metal, and a mixture of two or more thereof, but the present invention is not limited thereto.

In the (A) step, the solvent may be a polar solvent, and as a polar solvent, water, methanol, ethanol, propanol, isopropanol, butanol or a mixed solvent of two or more thereof may be used, and preferably, water, and more preferably, deionized water may be used.

When each precursor is dissolved to prepare the precursor solution, if deionized water is used as a solvent, impurities in the precursor solution may be minimized. Therefore, purity of the catalyst powder finally prepared may be improved. As a result, the improvement in the purity of the catalyst powder may mean the improvement in purity of a carbon nanotube.

In the (B) step, a catalyst powder may be formed by pyrolyzing the precursor solution after it is sprayed into a reactor. The (B) step may include (B1) feeding air at 2 to 5 atm as a carrier gas, introducing external air, and spraying a precursor solution into a reactor, and (B2) forming a catalyst powder by pyrolyzing the sprayed precursor solution at 600 to 1.200° C.

In the (B1) step, to control the particle diameter and apparent density of the catalyst powder, the precursor solution may be sprayed into the reactor, thereby converting the solution into more minute droplets.

In the spraying of the precursor solution, the pressure may be adjusted within a range of 2 to 5 atm. When the spray pressure is less than 2 atm, the particle diameter and apparent density of the catalyst powder may not be adjusted within certain ranges, and thus the purity of the synthesized carbon nanotube may be reduced. On the other hand, when the spray pressure is more than 5 atm, since the particle diameter of the droplet becomes very small, the obtained catalyst may be agglomerated.

As the surface tension of the precursor solution is overcome and an inertia force is efficiently transferred to the solution, the size of the droplet can be more precisely controlled, and therefore, the particle diameter and apparent density of the catalyst powder may be precisely controlled.

Accordingly, a droplet may be formed by spraying the precursor solution and a gas at the same time, or spraying a gas after the spraying of the precursor solution.

However, when the precursor solution and the gas are sequentially sprayed, the size of the droplet may be more precisely controlled, and therefore, the method of preparing a catalyst powder may further include spraying a gas into the reactor before the (B2) step.

Here, as the gas, air, nitrogen, argon or a mixed gas of two or more thereof, and preferably, air, may be used. In addition, to improve the efficiency of the droplet formation, an electrostatic attraction may be further applied in addition to the gas spraying.

When a gas is further sprayed after the spraying of the precursor solution, like when they are simultaneously sprayed, the pressure of the spray gas may be adjusted within a range of 2 to 5 atm, and an effect when the pressure exceeds the above range is the same as described above.

In the (B2) step, a catalyst powder may be finally prepared by heating the droplet to evaporate a solvent and decomposing a precursor. Here, the temperature of the reactor may be 600 to 1,200° C., and preferably, 700 to 900° C.

When the temperature of the reactor is less than 600° C., due to a poor drying condition of the catalyst powder, an additional process is needed, which means that it is disadvantageous in terms of economic feasibility, and therefore, the purity or physical properties of the carbon nanotube prepared thereby may be decreased. In addition, when the temperature of the reactor is more than 1,200° C. excessive costs may be used to construct equipment or a facility, leading to an economic loss, and a decrease in catalytic performance due to the formation of a solid solution or the modification of a crystal structure.

In the (C) step, a multi-walled carbon nanotube may be synthesized from the catalyst powder by inputting the catalyst powder into a reactor heated to 600 to 900° C. and spraying a carbon-based gas and a carrier gas. For example, the reactor may be a fluidized-bed reactor. Here, the (C) step may include (C1) heating a fluidized-bed reactor to 600 to 900° C.; (C2) feeding a catalyst powder into an upper part of the reactor and fluidizing it in the reactor, (C3) feeding a carbon-based gas and a carrier gas into a lower part of the reactor using a rotor blade; and (C4) thermally-vapor depositing carbon on the catalyst powder fluidized by an ascending air current generated by the rotor blade.

The (A) to (C) steps may be continuously performed, and particularly, the catalyst powder prepared by spray pyrolysis through the (A) and (B) steps may be continuously input into a fluidized-bed reactor for preparing a carbon nanotube, thereby effectively preparing a large amount of carbon nanotubes.

The catalyst powder may be used in gas-phase synthesis for synthesizing a carbon nanotube. Since Ma includes two or more types of metals selected from Ni, Co, Mn, Cr, Mo, V, W, Sn and Cu, and Mb includes one or more types of metals selected from Mg, Al, Si and Zr, the catalyst powder may include at least three or more types of metals, and preferably, 3 to 5 types of metal components.

Particularly, Ma includes a catalyst component and an active component in the catalyst powder. Compared with when a single metal component is used as the catalyst component and the active component, by mixing and using two or more types of metal components, the generation of impurities in the synthesis of a carbon nanotube may be inhibited to improve purity.

The term "catalyst component" used herein refers to a material that basically reduces the activation energy for a chemical reaction, that is, a main catalyst, and the "active component" used herein refers to a material that assists the action of the catalyst component, that is, a cocatalyst. When the catalyst component and the active component have a uniform distribution in a certain range, the synthesis yield of carbon nanotubes may be improved.

The mole fractions x and y of Ma and Mb may satisfy $2.0 \leq x \leq 5.5$ and $4.5 \leq y \leq 8.0$, respectively. When the mole fraction of x is less than 2.0, the activity of a catalyst and the synthesis yield of carbon nanotubes according to the catalyst activity may be decreased, and when the mole fraction of x is more than 5.5, since the content of a support component Mb is relatively small, the durability of the catalyst powder is degraded, and thus it is difficult to apply the catalyst powder to continuous fluidized-bed chemical vapor deposition for mass production of carbon nanotubes.

When the catalyst powder may have a hollow structure with an outer wall thickness of 0.5 to 10 μm, and preferably, 1 to 8 μm, and the hollow ratio may be 60 vol % or more. In addition, the apparent density of the catalyst powder may be 0.05 to 0.35 g/mL. When the structure and specification of the catalyst powder are outside the ranges, it is not possible to synthesize a carbon nanotube having a pyrolysis temperature of 600° C. or less, preferably, 400 to 600° C., and more preferably, 500 to 550° C.

The term "hollow structure" used herein refers to a three-dimensional structure with an empty inside, for example, a hollow spherical or similar three-dimensional shape, in which at least a part of the inside is surrounded by a certain type of material, thereby forming a shell. The thickness of the outer wall may be interpreted as meaning the thickness of the shell. In addition, the hollow structure may be interpreted as including a closed structure, which refers to the hollow is completely closed, an open structure, which refers to the hollow is partially open, or a combination thereof.

A solid spherical catalyst powder, which is conventionally used, is difficult to be applied to continuous fluidized-bed chemical vapor deposition for mass production of carbon nanotubes due to a high apparent density of more than approximately 0.7 g/mL, and difficult to improve a yield to a predetermined level or more since carbon nanotubes are grown only on the outer surface of the catalyst powder.

In addition, since the catalyst powder has a hollow structure, compared with the conventional catalyst powder, it has a lower apparent density, and thus can be applied to continuous fluidized-bed chemical vapor deposition. In addition, since the carbon nanotubes may be grown outwards from the outer surface of the hollow structure, and also grown inwards from the inner surface of the hollow structure, the carbon nanotube synthesis yield may be significantly improved.

The carbon-based gas may be one selected from the group consisting of, for example, saturated or unsaturated hydrocarbons having 1 to 4 carbon atoms, carbon monoxide, benzene and a mixture of two or more thereof, and preferably, an ethylene gas, but the present invention is not limited thereto. In addition, the carrier gas may be one selected from the group consisting of, for example, helium, nitrogen, argon and a mixture of two or more thereof, and preferably, nitrogen, but the present invention is not limited thereto.

After the (C) step, the method may further include (D) recovering the multi-walled carbon nanotubes from the fluidized-bed reactor. The (D) step may include (D1) transferring the multi-walled carbon nanotubes to a cyclone using a nitrogen gas; and (D2) selecting the multi-walled carbon nanotubes after impurities are removed from the multi-walled carbon nanotubes in the cyclone.

The term "cyclone" used herein means a device for separating impurities contained in a certain mixture, and the cyclone uses a principle in which, when the mixture containing impurities is introduced in the tangential direction of the upper circumference of a conical device, a high-speed spiral flow is generated, the impurities in the mixture strike a wall, thereby reducing kinetic energy, and are discharged to the lower part of the device and removed, and the impurity-free mixture is discharged to the upper part thereof. That is, a high-purity uniform product may be produced by discharging aggregated carbon nanotubes, which is a type of impurity, to the lower part of the cyclone and removal thereof, discharging the purified multi-walled carbon nanotubes to the upper part of the cyclone, and passing through a packaging device located at the rear end of the cyclone.

The multi-walled carbon nanotubes may be aggregated, and thus present as a bundle-type carbon nanotube. The bundle-type carbon nanotubes may be basically present as a plurality of carbon nanotubes, and preferably, an aggregated form of a plurality of multi-walled carbon nanotubes. Each carbon nanotube and an assembly thereof may have a linear or circular shape, or a mixture thereof.

The bundle-type carbon nanotubes may have an average bundle diameter of 0.5 to 20 μm, and an average bundle length of 10 to 200 μm. In addition, the multi-walled carbon nanotubes may have a Raman spectral intensity ratio ($I_G/I_D$) of 0.8 to 1.5, an average diameter of 5 to 50 nm, and an apparent density of 0.005 to 0.120 g/mL.

The bundle-type carbon nanotubes may be dispersed in a rubber matrix to form a three-dimensional network structure, and as the network structure is firmly formed, mechanical properties, dynamic properties and wear characteristics may be improved. Particularly, the network structure may be firmly formed by adjusting the average bundle diameter and average bundle length of the bundle-type carbon nanotubes to certain ranges.

Here, when the bundle-type carbon nanotubes have an average bundle diameter of less than 0.5 μm or an average bundle length of more than 200 μm, due to decreased dispersity, the mechanical properties, dynamic properties and wear characteristics of a part of the tire produced from the rubber composition may become non-uniform, and when the bundle-type carbon nanotubes have an average bundle diameter of more than 20 μm or an average bundle length of less than 10 μm, the network structure may become unstable, and thus the mechanical properties, dynamic properties and wear characteristics may be degraded.

The rubber matrix may include one selected from the group consisting of acrylonitrile-butadiene rubber, ethylene-propylene-diene rubber, styrene-butadiene rubber, butadiene rubber, natural rubber, isoprene rubber, butyl rubber and a combination of two or more thereof, and preferably, styrene-butadiene rubber and butadiene rubber, but the present invention is not limited thereto.

Meanwhile, as needed, the rubber composition for a tire may further include a known component or additive, which is conventionally included in the rubber composition for a tire, for example, silica, carbon black, a lubricant, a process oil, sulfur, a coupling agent, a crosslinking accelerator, or an antioxidant.

Method of Preparing Rubber Composition for Tire

Another aspect of the present invention provides a method of preparing a rubber composition for a tire, which includes (a) preparing carbon nanotubes, which have structural defects on at least a part of their surfaces and a pyrolysis temperature of 600° C. or less, using a catalyst containing a metal component according to the following formula and having a hollow structure with an outer wall thickness of 0.5 to 10 μm; and (b) mixing the carbon nanotubes and a rubber. The structure, form, type and effect of the carbon nanotubes, and a rubber are the same as described above.

$$Ma:Mb=x:y \qquad \text{<Formula>}$$

In this formula, Ma includes two or more types of metals selected from Ni, Co, Mn, Cr, Mo, V, W. Sn and Cu, Mb includes one or more types of metals selected from Mg, Al, Si and Zr, and x and y represent the mole fractions of Ma and Mb, respectively, in which x+y=10, 2.0≤x≤5.5, and 4.5≤y≤8.0.

As described above, the rubber composition for a tire may basically include a rubber matrix having a certain level of mechanical properties and moldability, and carbon nanotubes, which are a reinforcing material capable of further improving mechanical properties, dynamic properties and wear characteristics. To prepare the rubber composition for a tire, a process of mixing the rubber matrix and the carbon nanotubes is included.

To improve the mechanical properties of the conventional rubber composition for a tire, technology of increasing the content of carbon nanotubes has been suggested, but when the mixing of the rubber matrix and the carbon nanotubes is performed in a single process, there is a problem of degrading moldability and workability and the mechanical properties of the rubber matrix when the content of the carbon nanotubes exceeds a predetermined level.

To this end, in the (a) step, carbon nanotubes having a certain amount of structural defects on their surfaces may be synthesized using a catalyst having certain form and composition, and the structural defects included on the surfaces of the synthesized carbon nanotubes may improve the affinity and adhesion with the rubber matrix to significantly improve the mechanical properties, dynamic properties (braking characteristic and fuel efficiency) and wear characteristics of a tire produced from the rubber composition.

The (b) step may include (b1) preparing a master batch by mixing and pressing the carbon nanotubes and a part of the rubber, and (b2) mixing the master batch and the remainder of the rubber.

In the (b1) step, a master batch including a high content of carbon nanotubes may be prepared by mixing and pressing the carbon nanotubes and a part of the rubber. The "master batch" used herein is prepared by previously dispersing a high concentration of carbon nanotubes when the rubber composition is prepared, and as the master batch is prepared, the dispersity of the carbon nanotubes in the rubber matrix may be improved, and therefore, uniform mechanical properties, dynamic properties and wear characteristics may be realized in all regions of the tire produced from the rubber composition.

The master batch, which is the product of the (b1) step, may include a high content of carbon nanotubes. For example, the content of the carbon nanotubes in the master batch may be 5 to 30 parts by weight with respect to 100 parts by weight of the rubber included in the master batch. When the content of the carbon nanotubes is less than 5 parts by weight, a degree of concentrating the carbon nanotubes is very small, and when the content of the carbon nanotubes is more than 30 parts by weight, the composition of the prepared master batch may become non-uniform, and thus processability may be degraded.

While, in the (b1) step, the master batch may be prepared in a spherical, pellet or sheet form, if the dispersity of the carbon nanotubes can be improved in the subsequent (b2) step of mixing the master batch with a rubber, the master batch can be prepared without the limitation to its form.

In the (b2) step, a rubber composition for a tire may be obtained by diluting the concentration of carbon nanotubes by mixing the master batch with more rubber. An amount of the rubber further mixed in the (b2) step is sufficient to dilute the content of the carbon nanotubes in the rubber composition, which is the final product, to the above-described range.

Meanwhile, the carbon nanotubes used in the (b1) step may be processed by compressing a powder form into a pellet form, and when the pellet is mixed with a rubber in the (b1) and (b2) steps, the dispersibility of the carbon nanotubes in the rubber may be degraded. Therefore, the carbon nanotube pellet remaining in an aggregated state without dispersion after mixing may be physically pressed, thereby improving dispersibility.

The pressing may be performed by a method of passing the mixture of the rubber and the carbon nanotubes between a roll and a transfer plate, which are spaced a predetermined distance apart, or a pair of rolls, which are spaced a predetermined distance apart, and therefore, the mixture may be transformed into a sheet form. Here, in consideration of the tensile property of the pressed product, that is, the sheet, and the dispersibility of the carbon nanotubes in the sheet, the distance may be adjusted to 0.1 to 2.0 mm, and preferably, 0.5 to 2.0 mm.

Hereinafter, examples of the present invention will be described in detail with reference to the accompanying drawings.

Synthesis Example and Comparative Synthesis Example

A precursor solution was prepared by dissolving each precursor of $Fe(NO_3)_3 \cdot 9H_2O$, $Co(NO_3)_3 \cdot 6H_2O$, $(NH_4)_6Mo_7O_{24} \cdot 4H_2O$, $NH_4VO_3$, $(NH_4)_{10}H_2(W_2O_7)_6 \cdot 9H_2O$ and $Al(NO_3)_3 \cdot 9H_2O$, which were required for the catalyst compositions shown in Table 1 below, in deionized water. A catalyst powder was obtained by spraying the precursor solution into a reactor with air at 3 L per hour for pyrolysis. Here, pyrolysis was continuously performed under conditions including a pressure of 3 atm and an inner temperature of the reactor of 750° C. for 120 minutes.

TABLE 1

| Classification | Catalyst Composition | Fe | Co | Al | V | W | Mo |
|---|---|---|---|---|---|---|---|
| Synthesis Example | Co/Al/V/W | — | 7 | 4 | 0.5 | 1.5 | — |
| Comparative Synthesis Example | Fe/Co/Al/Mo | 3.75 | 1.25 | 5 | — | — | 0.5 |

(units: parts by weight)

Examples and Comparative Example

The synthesis of carbon nanotubes was performed using the catalyst powders according to the synthesis example and the comparative synthesis example. Specifically, each catalyst powder was input into a fluidized-bed chemical vapor deposition reactor having a diameter of 350 mm and heated to and maintained at 700 to 800° C. under a nitrogen atmosphere. Afterward, carbon nanotubes grown on each catalyst powder were synthesized by a reaction for 40 minutes while a mixed gas of nitrogen and ethylene was fed at a rate of 150 L per minute.

The apparent density of the carbon nanotubes was calculated by filling a mass cylinder with a catalyst powder, measuring a weight, and then dividing the measured weight by the volume of the mass cylinder. In addition, the synthesis yield of the carbon nanotubes was calculated according to the formula "[weight of synthesized carbon nanotubes (g)]/[weight of input catalyst powder (g)]*100", and the result is shown in Table 2 below. In addition, thermogravimetric analysis and TEM image analysis of the carbon nanotubes were performed, and the results are shown in Table 2 below, and FIGS. 1 and 2.

TABLE 2

| Classification Catalyst used | Comparative Example 1 Comparative Synthesis Example | Example 1 Synthesis Example | Example 2 Synthesis Example |
|---|---|---|---|
| Carbon nanotube synthesis temperature (° C.) | 800 | 800 | 730 |
| Carbon nanotube synthesis yield (%) | 1,520 | 1,630 | 1,525 |
| Carbon nanotube apparent density (g/mL) | 0.024 | 0.028 | 0.025 |
| Carbon nanotube pyrolysis temperature (° C.) | 630 | 533 | 506 |

Figure 2:
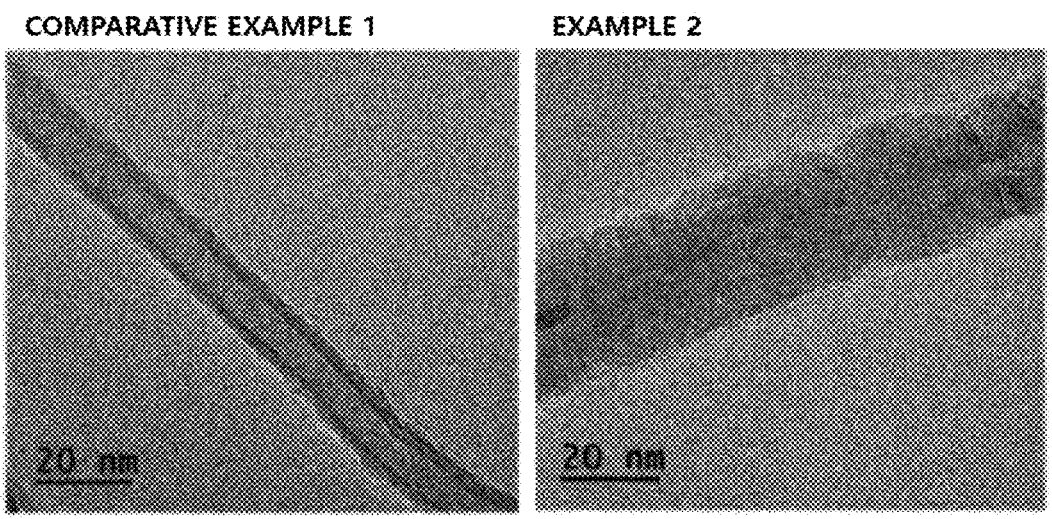
FIG. 2 shows a set of TEM images of carbon nanotubes according to an example and a comparative example.

Referring to Table 2, and FIGS. 1 and 2, it can be seen that the carbon nanotubes of Comparative Example 1 prepared using a catalyst containing iron (Fe) have almost no structural defect due to a higher measured pyrolysis temperature than that when a Fe-free catalyst was used.

However, in the consideration of adhesion, that is, the interfacial adhesion between the carbon nanotubes and a rubber matrix, the structural defect of the carbon nanotubes has a synergistic effect of improving the adhesion with the rubber matrix. Accordingly, since the carbon nanotubes of Examples 1 and 2 have a lower pyrolysis temperature than those of Comparative Example 1, and a certain amount of structural defects on their surfaces, the adhesion with the rubber matrix may be significantly improved.

Preparation Examples and Comparative Preparation Example

Preparation Example 1: Preparation of Rubber-Carbon Nanotube Master Batch 363.6 g of butadiene rubber (Kumho Petrochemical, NdBR40) was input into a 0.5 L Banbury mixer and mixed at 50° C. and a rotary speed of 40 rpm for 1 minute, 36.4 g (10 phr) of the carbon nanotubes of Example 2 were input thereinto and then mixed at a rotary speed of 45 rpm for 3 minutes and a rotary speed of 60 rpm for 3 minutes. The mixed blend was input to an open roll with a 1 mm gap and molded into a sheet form by performing mastication and triangle folding three times, resulting in the preparation of a butadiene rubber-carbon nanotube master batch.

Preparation Examples 2 to 4 and Comparative Preparation Example: Preparation of Rubber Composite for Tire A primary blend composition was obtained by inputting 3 parts by weight of zinc oxide (ZnO), 2 parts by weight of stearic acid, 80 parts by weight of silica (ZEOSIL 7000GR), 1 part by weight of carbon nanotubes, 12.8 parts by weight of a coupling agent (X-50S), 25 parts by weight of process oil (TDAE) and 1 part by weight of an antioxidant (6PPD) with respect to 70 parts by weight of styrene-butadiene rubber (SSBR, Kumho Petrochemical, SOL5360H) and 30 parts by weight of butadiene rubber (BR. Kumho Petrochemical. NdBR40) into a Banbury mixer and mixing the resulting mixture at 60° C. and 60 to 75 rpm for 7 minutes and 50 seconds.

A rubber composition was obtained by mixing 1.5 parts by weight of sulfur, 3.6 parts by weight of a vulcanization accelerator (1.8 parts by weight of 1,3-diphenyl guanidine (DPG) and 1.8 parts by weight of N-cyclohexyl-2-benzothiazole sulfenamide (CBS)), and the primary blend composition with respect to 100 parts by weight of a rubber in a Banbury mixer, and mixing the resulting mixture at 50° C. and 50 rpm for 2 minutes.

Meanwhile, a primary blend composition was obtained by inputting 11 parts by weight of the master batch obtained in Preparation Example 1. 3 parts by weight of zinc oxide (ZnO), 2 parts by weight of stearic acid, 80 parts by weight of silica (ZEOSIL 7000GR), 12.8 parts by weight of a coupling agent (X-50S), 25 parts by weight of process oil (TDAE) and 1 part by weight of an antioxidant (6PPD) with respect to 70 parts by weight of SSBR (Kumho Petrochemical, SOL5360H) and 20 parts by weight of BR (Kumho Petrochemical NdBR40) into a Banbury mixer, and mixing the resulting mixture at 60° C. and 60 to 75 rpm for 7 minutes and 50 seconds.

A rubber composition was obtained by inputting 1.5 parts by weight of sulfur, 3.6 parts by weight of a vulcanization accelerator (1.8 parts by weight of DPG and 1.8 parts by weight of CBS), and the primary blend composition with respect to 100 parts by weight of a rubber into a Banbury mixer, and mixing the resulting mixture at 50° C. and 50 rpm for 2 minutes.

The ratios of raw materials used in blending are shown in Table 3 below.

TABLE 3

| Classification | Comparative Preparation Example 1 | Preparation Example 2 | Preparation Example 3 | Preparation Example 4 |
| --- | --- | --- | --- | --- |
| SSBR | 70 | 70 | 70 | 70 |
| BR | 30 | 30 | 30 | 20 |
| Carbon nanotube | 1 (Comparative Example 1) | 1 (Example 1) | 1 (Example 2) | — |
| Carbon nanotube master batch | — | — | — | 11 (Preparation Example 1) |
| Zinc oxide | 3 | 3 | 3 | 3 |
| Stearic acid | 2 | 2 | 2 | 2 |
| Silica | 80 | 80 | 80 | 80 |
| Coupling agent | 12.8 | 12.8 | 12.8 | 12.8 |
| Process oil | 25 | 25 | 25 | 25 |
| Antioxidant | 1 | 1 | 1 | 1 |
| Sulfur | 1.5 | 1.5 | 1.5 | 1.5 |
| DPG | 1.8 | 1.8 | 1.8 | 1.8 |
| CBS | 1.8 | 1.8 | 1.8 | 1.8 |

(units: parts by weight)

The prepared rubber compositions were molded into a sheet with a thickness of 2 mm using a roll mixer at 50° C., and then subjected to crosslinking at a pressure of 160 kgf/cm² or more using a hot press at 160° C. A crosslinking time was measured using a rubber process analyzer. The mechanical properties, wear characteristics and dynamic properties of the crosslinked specimens were evaluated, and shown in Table 4 below.

TABLE 4

| Classification | Comparative Preparation Example 1 | Preparation Example 2 | Preparation Example 3 | Preparation Example 4 |
|---|---|---|---|---|
| Hardness (Shore A) | 75 | 74 | 74 | 74 |
| Tensile strength (kgf/cm²) | 201 | 208 | 209 | 211 |
| Elongation (%) | 358 | 368 | 370 | 372 |
| 100% elastic modulus (kgf/cm²) | 40.9 | 39.8 | 39.7 | 39.7 |
| 300% elastic modulus (kgf/cm²) | 134 | 136 | 135 | 133 |
| Mooney viscosity (ML$_{1+4}$, 100° C.) | 104 | 102 | 102 | 103 |
| Abrasion loss (g) | 0.2148 | 0.2002 | 0.1920 | 0.1904 |
| Tanδ (0° C.) | 0.277 | 0.283 | 0.281 | 0.279 |
| Tanδ (60° C.) | 0.1278 | 0.1145 | 0.1085 | 0.1079 |

Referring to Table 4, it can be seen that the mechanical properties, dynamic properties (braking characteristic and fuel efficiency) and wear characteristics of the specimens of Examples 2 to 4 to which the carbon nanotubes of the examples were applied were significantly improved, compared to the specimen of Comparative Preparation Example 1 to which the carbon nanotubes of Comparative Example were applied.

It should be understood by those of ordinary skill in the art that the above description of the present invention is exemplary, and the exemplary embodiments disclosed herein can be easily modified into other specific forms without departing from the technical spirit or essential features of the present invention. Therefore, the exemplary embodiments described above should be interpreted as illustrative and not limited in any aspect. For example, each component described as a single unit may be implemented in a distributed manner, and components described as being distributed may also be implemented in combined form.

The scope of the present invention is defined by the appended claims and encompasses all modifications and alterations derived from meanings, the scope and equivalents of the appended claims.

The invention claimed is:

1. A rubber composition for a tire, comprising: carbon nanotubes having structural defects on at least a part of their surfaces and a pyrolysis temperature of 600° C. or less.

2. The rubber composition of claim 1, wherein the carbon nanotube is a bundled carbon nanotube, which consists of multi-walled carbon nanotubes, prepared using a catalyst containing a metal component according to the following formula and having a hollow structure with an outer wall thickness of 0.5 to 10 μm:

Ma:Mb=x:y  <Formula> wherein Ma includes two or more metals selected from Ni, Co, Mn, Cr, Mo, V, W, Sn and Cu, Mb includes one or more metals selected from Mg, Al, Si and Zr, and x and y represent the mole fractions of Ma and Mb, respectively, in which x+y=10, 2.0≤x≤5.5, and 4.5≤y≤8.0.

3. The rubber composition of claim 2, wherein the catalyst has an apparent density of 0.05 to 0.35 g/mL.

4. The rubber composition of claim 2, wherein the catalyst has an outer wall thickness of 1 to 8 μm.

5. The rubber composition of claim 2, wherein a hollow ratio of the hollow structure is 60 vol % or more.

6. The rubber composition of claim 2, wherein the bundled carbon nanotube has an average bundle diameter of 0.5 to 20 μm and an average bundle length of 10 to 200 μm.

7. The rubber composition of claim 2, wherein the multi-walled carbon nanotube has a Raman spectral intensity ratio (IG/ID) of 0.8 to 1.5.

8. The rubber composition of claim 2, wherein the multi-walled carbon nanotube has an average diameter of 5 to 50 nm.

9. The rubber composition of claim 2, wherein the multi-walled carbon nanotube has an apparent density of 0.005 to 0.120 g/mL.

10. The rubber composition of claim 1, further comprising a rubber matrix including one selected from the group consisting of acrylonitrile-butadiene rubber, ethylene-propylene-diene rubber, styrene-butadiene rubber, butadiene rubber, natural rubber, isoprene rubber, butyl rubber and a combination of two or more thereof.

11. The rubber composition of claim 1, further comprising a rubber matrix, wherein a content of the carbon nanotubes is 0.1 to 10 parts by weight with respect to 100 parts by weight of the rubber matrix.

12. A method of preparing a rubber composition for a tire, comprising:
(a) preparing carbon nanotubes, which have structural defects on at least a part of their surfaces and a pyrolysis temperature of 600° C. or less, using a catalyst containing a metal component according to the following formula and having a hollow structure with an outer wall thickness of 0.5 to 10 μm; and (b) mixing the carbon nanotubes and a rubber:

Ma:Mb=x:y  <Formula> wherein Ma includes two or more metals selected from Ni, Co, Mn, Cr, Mo, V, W, Sn and Cu, Mb includes one or more metals selected from Mg, Al, Si and Zr, and x and y represent the mole fractions of Ma and Mb, respectively, in which x+y=10, 2.0≤x≤5.5, and 4.55≤y≤8.0.

13. The method of claim 12, wherein the (b) step comprises (b1) preparing a master batch by mixing and pressing the carbon nanotubes and a part of the rubber, and (b2) mixing the master batch and the remainder of the rubber.

\* \* \* \* \*